United States Patent

Hwu et al.

[11] Patent Number: 6,114,439
[45] Date of Patent: *Sep. 5, 2000

[54] CROSSLINKABLE AQUEOUS POLYESTER EMULSION AND PROCESS FOR PREPARING THE SAME

[75] Inventors: Herng-Dar Hwu; Yih-Her Chang, both of Hsinchu; Tsing-Tang Song, Yilan Hsien; Tsai-Wie Tseng, Hsinchu, all of Taiwan

[73] Assignee: Industrial Technology Research Institute, Hsinchu, Taiwan

[ * ] Notice: This patent issued on a continued prosecution application filed under 37 CFR 1.53(d), and is subject to the twenty year patent term provisions of 35 U.S.C. 154(a)(2).

[21] Appl. No.: 08/950,595

[22] Filed: Oct. 15, 1997

[30] Foreign Application Priority Data

Apr. 24, 1997 [TW] Taiwan ................................. 86105382

[51] Int. Cl.⁷ ............................ C08L 67/02; C08L 67/00
[52] U.S. Cl. .......................... 524/845; 524/603; 524/513; 523/206
[58] Field of Search ..................... 524/513, 600, 524/603, 845; 523/201, 206; 526/225

[56] References Cited

U.S. PATENT DOCUMENTS

| | | | |
|---|---|---|---|
| 4,340,519 | 7/1982 | Kotera et al. | 524/539 |
| 5,268,412 | 12/1993 | Raynolds . | |
| 5,294,650 | 3/1994 | Sharma | 524/513 |
| 5,492,959 | 2/1996 | Clark . | |

*Primary Examiner*—Tae Yoon
*Attorney, Agent, or Firm*—Sughrue, Mion, Zinn, Macpeak & Seas, PLLC

[57] ABSTRACT

A crosslinkable aqueous polyester-containing emulsion and a process for preparing the same. The emulsion is obtained by polymerizing unsaturated monomers of acrylic, using a crosslinkable, sulfonated polyester emulsifier having an acid number less than 80 mg KOH/g and an intrinsic viscosity greater than 0.1 dl/g as an emulsifier. The emulsion has the chemical characteristics of both polyester and acrylic resin, i.e. has low volatile organic compounds, good mechanical stability, and good storage stability. Since the emulsion is crosslinkable, a film formed by the emulsion has excellent adhesion, water and heat resistance. Thus, the emulsion is useful for coating and printing on Nylon, PET, OPP films, as well as for high performance industrial surface coating and adhesion for which good heat-, water-, and weather-resistance are required.

9 Claims, No Drawings

CROSSLINKABLE AQUEOUS POLYESTER EMULSION AND PROCESS FOR PREPARING THE SAME

BACKGROUND OF THE INVENTION

1. Field of the Invention

This invention relates to a crosslinkable aqueous polyester emulsion and a process for preparing the same. In particular, it relates to an emulsion polymerization of a crosslinkable aqueous polyester and an acrylic monomer hybrid. The blends of these emulsions, after being formed into films, have excellent water resistance and adhesion, and are thus useful in printing on Nylon, PET, and OPP films, as well as other high performance industrial surface coating and adhesion applications.

2. Description of Related Art

In order to improve water-resistance and block resistance of an emulsion suitably for use in industrial surface coating and adhesive applications, a water dispersible sulfo-polyester and an acrylic resin blends are prepared. For example, U.S. Pat. Nos. 4,921,899, 5,218,032, and 5,294,650 disclose emulsion containing blends of water dispersible sulfo-polyester and acrylic resin, and the sulfo-polyester contains at least 12 mole percent of difunctional sulfomonomer. Since the blends of these emulsions contain a large amount of hydrophilic groups, these kinds of emulsions, after being formed into films, have poor water resistance.

As an alternative, emulsion polymerization of an acrylic monomer or ethylene monomer, using a sulfonate group-containing aqueous polyester as an emulsifier are proposed to improve the water resistance and adhesion on certain substrates. In this approach, the water-soluble or water-dispersible sulfo-polyester must have low molecular weight and the monomers must be dissoluble or slightly soluble in water. For example, U.S. Pat. No. 4,946,932 discloses a method of preparing emulsion by emulsion polymerization of a water dispersible sulfonate group-containing polyester and unsaturated monomers with the addition of aqueous initiators. Moreover, in order to improve the emulsion stability, it is proposed in U.S. Pat. No. 5,268,421 to use an additional reactive surfactant in the preparation of the blends. Since the polyester used in the preparation of the emulsion must contain enough sulfonate groups to provide appropriate water dispersion properties, the emulsion, after being formed into a film, exhibits poor water-resistance.

U.S. Pat. No. 5,342,877 discloses an emulsion which is prepared from a water-soluble polyester, a styrene monomer, and a crosslinkable containing acrylic monomer blends. However, since the water-soluble polyester still contains many high hydrophilic sulfonate groups, the water-resistance of the emulsion, after a film is formed, is not much improved.

SUMMARY OF THE INVENTION

It is therefore an object of the present invention to provide a process for preparing water dispersible sulfo-polyester and hybrid with unsaturated monomers which exhibit excellent water-resistance, stability and adhesion, suitably for high performance industrial surface coating and adhesion applications.

The above object can be achieved by a blend of aqueous polyester and acrylic resin which includes:

(a) a crosslinkable aqueous polyester having the following structural formula:

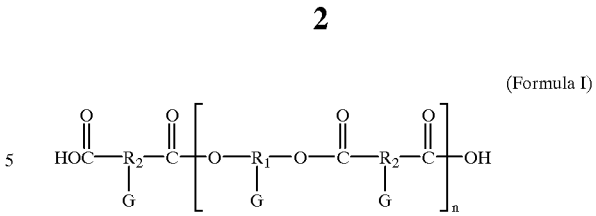

(Formula I)

wherein G is $G_1$, $G_2$ or $G_3$, and $G_1$ is $-SO_3M$, wherein M is an alkali metal or an alkaline earth metal, $G_2$ is $-COOH$ and $G_3$ is $-H$, $R_1$ and $R_2$ is an alkylene group containing 2–12 carbon atoms or an arylene group; wherein $G_1$ constitutes between 3 to 25 mole percent (%), $G_2$ constitutes between 5 to 25 mole %, and $G_3$ constitutes between 50 to 92 mole % of the total moles of the polyester; and (b) a resin, wherein the crosslinkable aqueous polyester constitutes between 0.1 to 99.9 weight percent (wt %) of the total solid content of the emulsion, and the resin constitutes between 99.9 to 0.1 wt % of the total solid content of the blend emulsion.

The crosslinkable aqueous polyester-containing emulsion of the present invention is prepared by the following steps:

(a) dissolving the crosslinkable aqueous polyester of Formula I in water to obtain a polyester solution;

(b) adding an unsaturated monomer to the polyester solution and polymerizing the monomer in the presence of an initiator and at a temperature between 35° C. and 95° C. to form the emulsion.

According to an aspect of the invention, the blend emulsion is prepared by using a polyester containing multi-hydrophilic groups, i.e. sulfonate groups and carboxyl groups as an emulsifier in the emulsion polymerization reaction, The sulfonate groups provide hydrophilic properties which improve the aqueous dispersion property of the polyester. The multi-functional carboxyl groups not only provide hydrophilic properties but also act as reacting groups for crosslinking, thereby improving the physical properties of the emulsion and the water resistance of a film formed by the emulsion.

DETAILED DESCRIPTION OF THE INVENTION

In accordance with the present invention, the crosslinkable aqueous polyester-containing blend emulsion is prepared by dissolving an aqueous polyester containing both sulfonate groups and carboxyl groups in water to form a polyester solution, followed by adding an unsaturated monomer to the polyester solution and polymerizing the monomer in the presence of an initiator.

In accordance with the present invention, the crosslinkable aqueous polyester is prepared by subjecting a carboxyl group-containing compound, a sulfonate group-containing compound, a diacid or its derivatives, and a diol to esterification, followed by polymerization.

In accordance with the present invention, the carboxyl group-containing compounds include compounds having a structural formula of $R_a-COOH$ wherein Ra is a diacid, a diol or an anhydride having 2–12 carbon atoms. Examples of the above carboxyl group-containing compounds include but are not limited to trimellitic anhydride (TMA), trimellitic acid, dimethylol propionic acid, trimesic acid, pyromellitic anhydride, pyromellitic dianhydride, and 3,3',4,4'-benzophenone dianhydride.

The sulfonate-containing compounds include compounds having a structural formula of Rb-SO$_3^-$M$^+$ wherein R$_b$ is a diol, a diacid or an anhydride having 2–12 carbon atoms, and M$^+$ is an alkali metal ion or an alkaline earth metal ion, such as Li$^+$, Na$^+$, K$^+$, Mg$^{+2}$, Ca$^{+2}$. Examples of the above sulfonate-containing compounds include but are not limited to sodium salt of sulfoisophthalate (SSIPA), sodium salt of dimethyl 5-sulfoisophthalate (SSIPM), sodium of bis(2-hydroxy ethyl) 5-sulfoisophthalate, sodium salt of sulfoterephthalate, sodium salt of sulfo-succinate, sodium salt of sulfo-ethylene glycol, sodium salt of sulfopropylene glycol, sodium salt of sulfo-butylene diol, and the mixture thereof. The diacids component and their derivatives include but are not limited to terephthalic acid, isophthalic acid, 1,4-cyclohexanedicarboxylic acid, succinic acid, glutaric acid, adipic acid, sebacic acid, azelaic acid, dodecane dicarboxylic acid, 6H-p-phthalic acid, p-dimethyl phthalate, m-dimethyl phthalate, 2,6-naphthalene-dicarboxylic acid, and the mixture thereof. The diols component include but are not limited to ethylene glycol, propylene glycol, diehylene glycol, 1,4-cyclohexanediol, neopentyl glycol, 1,6-hexanediol, 1,4-cyclohexane dimethanol, and polyethylene ether glycol.

The process of preparing the aqueous polyester of the present invention includes stages of "esterification" and "polymerization." The aqueous polyester can be prepared by a process wherein all of the sulfonate-containing compound, the carboxyl group-containing compound, the diacid, and the diol are simultaneously added to a reactor for esterification, followed by a polymerization. Specifically, a carboxyl group-containing compound, a sulfonate group-containing compound, a diacid, and a diol are introduced to a reactor, and then an esterification or ester exchange reaction is performed in a reactor at a temperature between 165° C. and 250° C. After the esterification conversion is over 90%, excess diol is evacuated from the reactor under a vacuum degree of less than 10 torr. Then, a polymerization process is performed at a temperature of between 240° C. and 290° C. and a pressure of lower than 10 torr to obtain a polyester emulsifier having an intrinsic viscosity IV$\geq$0.1 dl/g.

Optionally, the sulfonate group-containing compound, the diacid, and the diol can be first added to a reactor for esterification and polymerization, and then the carboxyl group-containing compound is added for re-esterification to finish the process. Specifically, a diacid, a diol, and a sulfonate group-containing compound are introduced to a reactor first, and then an esterification or ester exchange reaction is performed at a temperature of between 165° C. and 250° C. Then, a polymerization is performed at a temperature of between 240° C. and 290° C. and a pressure of lower than 10 torr to obtain a polyester containing only sulfonate group, having an intrinsic viscosity IV$\geq$0.1 dl/g. The reaction temperature is then lowered to a range between 180° C. to 210° C., and the carboxyl group-containing compound is added and a further esterification or ester exchange reaction is performed to obtain a polyester emulsifier having an intrinsic viscosity IV$\geq$0.08 dl/g. Note that according to the process of the invention, the carboxyl group-containing compound can also be added in two portions, i.e. in the esterification stage, a portion of the carboxyl group-containing compound is added, and then the remaining portion is added in the polymerization stage.

In accordance with the present invention, the amount of the sulfonate group-containing compound is between 3 and 25 mole percent, preferably between 5 to 15 mole percent based on 100 mole percent diacid. The amount of the carboxyl group-containing is between 5 and 25 mole percent based on 100 mole percent diacid.

In accordance with the esterification or ester exchange reaction, the molar ratio of diol to diacid is 1.05:1 to 10.0:1, preferably 1.1:1 to 6.0:1. An esterification catalyst is used in the esterification. The esterification catalyst is an oxide or organic compound of a metal selected from titanium, aluminum, lead, zinc, magnesium, sodium, and manganese. The amount of the esterification catalyst is between 0.02 and 0.5 wt % based on 100 weight percent diacid. A polymerization catalyst is used in the polymerization. The polymerization catalyst is an oxide or organic compound of a metal selected from titanium, germanium, and antimony. The amount of the polymerization catalyst is between 0.02 and 0.5 wt % based on 100 weight percent diol.

The aqueous polyester prepared according to the process of the invention has an intrinsic viscosity (IV) 0.1 to 0.5 dl/g, preferably 0.15 to 0.45 dl/g, and an acid number 5 to 80 mg KOH/g, preferably between 15 to 60 mg KOH/g.

In accordance with the present invention, the unsaturated monomers can be acrylic acid, acrylate, acrylonitrile, or ethylene. Examples of the above unsaturated monomers include but are not limited to acrylic acid, methacrylic acid, butyl acrylate, methyl methacrylate, 2-ethylhexyl acrylate, 2-hydroxylpropyl methacrylate, 2-hydroxylpropyl acrylate, methyl acrylonitrile, ethylene acetate, styrene, vinyl chloride, or other unsaturated monomers containing crosslinkable groups.

The process for preparing the emulsion of polyester and acrylic resin according to the present invention includes the steps of: dispersing the polyester in water to form a solution; adding and mixing the unsaturated monomer with the solution to form an emulsion; and initiating an emulsion polymerization in the presence of an initiator. Specifically, the unsaturated monomer is first introduced to the polyester water solution of this invention to form an emulsion. Then an initiator is added and an emulsion polymerization is performed at a temperature of between 35° C. and 95° C. to produce an emulsion. Optionally, dispersing the polyester in water solution of this invention is first mixed with the initiator. The unsaturated monomer is then added, in batches, to the mixture of polyester and initiator. The temperature is raised to a range between 35° C. and 95° C. for performing the emulsion polymerization.

The ratio of polyester to unsaturated monomer is varied depending on the application field of emulsion. In accordance with the process of preparing a crosslinkable aqueous polyester-containing emulsion of the invention, the crosslinkable aqueous polyester constitutes between 0.1 to 99.9 weight percent (wt %), preferably 4 to 50 wt %, more preferably 8 to 30 wt %, of the total solids content of the emulsion. And the resin constitutes 99.9 to 0.1 wt %, preferably 96 to 50 wt %, more preferably 92 to 70 wt %, of the total solids content of the emulsion.

Both thermal initiators and redox initiators can be used in the emulsion polymerization. Examples of the above thermal initiators include but are not limited to water-soluble ammonium persulfate, sodium persulfate, potassium persulfate, or oil-soluble azoisobutylonitrile (AIBN), benzoyl peroxide (BPO). Examples of the above redox initiators include but are not limited to sodium persulfate/sodium metabisulphite, sodium formaldehyde sulfoxylate/Fe/hydrogen peroxide. The amount of the initiator is between 0.01 and 2% based on the total amount of the emulsion.

In the preparation of the solution of the sulfonate group-containing polyester, the polyester is first dissolved in hot water with the pH of 3 to 10 to obtain a feasible dispersivity. The unsaturated monomer is then added to the polyester solution to form a mixed solution. The mixed solution is then introduced to a reactor in whole or in portion with the addtion of the initiator to initiate the polymerization.

The temperature of polymerization is 35° C. to 95° C. In case a water-soluble persulfate is used as the initiator, the temperature is controlled in a range of between 70° C. and 90° C. When the polymerization is near completion, a slight amount of initiator is preferably added to react with the remaining monomer. The resulting emulsion has a solid content of between 25 and 60%, and an acid number of between 2 to 40 mg KOH/g.

The resulting emulsion blend contains crosslinkable functional groups, i.e. hydroxyl groups and carboxyl groups, and therefore it can be further crosslinked with additional crosslinking agents to form a network structure so as to improve the mechanical property, adhesion strength, and water-resistance of the film formed by the emulsion. Examples of the additional crosslinking agents include but are not limited to organic amine resin, epoxy group resin, isocyanate resin, aziridine, oxazoline, carbonized diimide, zincate, and zirconate complex. Therefore, the emulsions according to the present invention are useful in the field of high performance industrial surface coating and adhesion for which good heat-, water-, and weather-resistance are required.

Other objects, features and advantages of the present invention will be further illustrated by the following preferred but non-limiting examples.

PREPARATION EXAMPLE 1

A mixture of isophthalic acid (IPA), sodium salt of dimethyl 5-sulfoisophthalate (SSIPM), succinic acid (SA), diethyl glycol (DEG), neopentyl glycol (NPG), and catalyst titanium was charged to a four-neck reaction flask fitted with a stirrer, a distillator, a thermometer, a feeding inlet, and a nitrogen gas inlet, and heated with gentle stirring to over 175° C. for esterification. Two hours after the water production ratio reached 95%, the reaction temperature was raised to about 275° C. and the pressure was reduced to about 5 torr for polymerization for 1 hour. The reaction temperature was then lowered and nitrogen gas was introduced to the reaction flask to raise the pressure. When the reaction temperature was lowered to about 210° C., trimellitic anhydride (TMA) was added for further reaction for 1.5 hours to give an aqueous polyester (A). The content of each components and the properties of the resulting aqueous polyester (A), such as acid number (AN) and intrinsic viscosity (IV), are shown in TABLE 1.

PREPARATION EXAMPLE 2

The same reaction flask, procedures and components as in preparation example 1 were used, except that NPG was replaced by 1,4-cyclohexane dimethanol (CHDM). This produces another aqueous polyester(B). The content of each components and the properties of the resulting aqueous polyester (B), such as acid number (AN) and intrinsic viscosity (IV), are shown in TABLE 1 as well.

TABLE 1

|  | Aqueous polyester(A) | | Aqueous polyester(B) | |
| --- | --- | --- | --- | --- |
|  | Weight (g) | Mole % | Weight (g) | Mole % |
| IPA | 113.7 | 68.5 | 107.9 | 65 |
| SSIPM | 29.6 | 10 | 40.2 | 15 |
| SA | 13.6 | 11.5 | 9.44 | 8 |
| DEG | 74.2 | 70 | 66.8 | 63 |
| CHDM | — | — | 57.6 | 40 |
| TMA | 19.2 | 10 | 23.0 | 12 |
| NPG | 62.4 | 60 | — | — |
| Ti | 0.9 | — | 0.06 | — |
| AN (mg KOH/g) | 42 | | 53 | |
| IV (dl/g) | 0.25 | | 0.16 | |

EXAMPLE 1

A mixture of 223.4 g of solution containing 18.3% of polyester(A), 102.3 g of styrene monomer, and 102.3 g of 2-ethylhexyl acrylate (2EHA) monomer was stirred to form a milk-like solution. 100 g of the milk-like solution was mixed with 100 g of water and heated to a temperature of about 70° C. 11 g of solution containing 9.1% of sodium persulfate was added as an initiator. The temperature began to rise and reached about 86° C. After about 10 minutes, the temperature was kept at about 80° C. The remaining milk-like solution was added dropwise within 2 hours. Then, 1.0 g of solution containing 4% of sodium persulfate was added as additional initiator. After about 2 hours, the product was cooled down and filtered.

EXAMPLE 2

A mixture of 230 g of solution containing 17.4% of polyester(B), 90 g of methyl methacrylate (MMA) monomer, 90 g of butyl acrylate monomer, and 10 g of 2-hydroxylpropyl methacrylate (HEMA) monomer was stirred to form a milk-like solution. 90 g of the milk-like solution was mixed with 100 g of water and heated to a temperature of about 70° C. 11 g of solution containing 9.1% of sodium persulfate was added as an initiator. The temperature began to rise and reached about 86° C. After about 10 minutes, the temperature was kept at about 80° C. The remaining milk-like solution was added dropwise within 2 hours. Then, 1.0 g of solution containing 4% of sodium persulfate was added as additional initiator. After about 2 hours, the product was cooled down and filtered.

APPLICATION EXAMPLE 1

20 g of blend emulsion prepared in example 1 and 20 g of color paste (which contains 25% of pigment and 2.2% of dispersing agent) were formulated into printing inks. The printing inks were coated on corona treated PET films. The ink coated PET films were then dried in an oven at a temperature of about 45° C. for about 8 hours, followed by boiling in hot water of about 100° C. for about 30 minutes. The adhesion of the inks on the PET films were then measured by placing a piece of adhesive tape on the ink film and removes the ink film. It was observed that the printing inks prepared from this application example have good adhesion to the PET films.

COMPARATIVE EXAMPLE

The same procedures as in application example 1 were used to prepare printing inks, except that the polyester(A) was replaced by a sulfonate group-containing polyester AQ55S from Eastman Chemical Co. The adhesion of the printing inks on the PET films were then tested by using an adhesive tape. It was observed that the printing inks of this comparative example was peeled off after the PET film was boiled. This demonstrates that the adhesion and water-resistance of the AQ55S containing inks are poor.

APPLICATION EXAMPLE 2

20 g of emulsion prepared in example 2 and 20 g of color paste (which contains 25% of pigment and 2.2% of dispersing agent) were formulated into printing inks. 0.4 g of polyisocyanate hardener was added to the printing inks. The printing inks were then coated on corona treated PET films. The ink-coated PET films were dried in an oven at a temperature of about 45° C. for about 8 hours, followed by boiling in hot water of about 100° C. for about 30 minutes. The adhesion of the inks on the PET films were then tested by using an adhesive tape. It was observed that the printing inks prepared from this application have very good adhesion to the PET films. Consequently, the emulsions of the present invention have improved water resistance.

While the invention has been described by way of example and in terms of a preferred embodiment, it is to be understood that the invention is not to be limited thereto. On the contrary, it is intended that the invention cover various modifications and similar arrangements within the spirit and scope of the appended claims, which should be accorded the broadest interpretation so as to encompass all such modifications and similar arrangements.

What is claimed is:

1. A crosslinkable aqueous polyester-containing emulsion which includes:

(a) a crosslinkable aqueous polyester having the following structural formula:

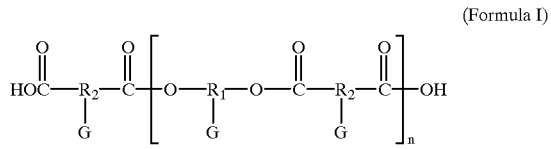

(Formula I)

wherein G is $G_1$, $G_2$ or $G_3$ and $G_1$ is —$SO_3M$, wherein M is an alkali metal or an alkaline earth metal, $G_2$ is —COOH and $G_3$ is —H, $R_1$ and $R_2$ is an alklyene group containing 2–12 carbon atoms or an arylene group; wherein $G_1$ constitutes between 3 and 25 mole percent (%), $G_2$ constitutes between 5 and 25 mole %, and $G_3$ constitutes between 50 and 92 mole % of the total moles of the polyester; and (b) a resin made by emulsion polymerization of an unsaturated monomer using said polyester as an emulsifier;

wherein said crosslinkable aqueous polyester constitutes between 0.1 and 99.9 weight percent (wt %) of the total solids content of the blend emulsion, [and] said resin constitutes between 99.9 and 0.1 wt % of the total solids content of the blend emulsion and said polyester has an intrinsic viscosity (IV) between 0.1 and 0.5 dl/g.

2. The emulsion as recited in claim 1, wherein said crosslinkable aqueous polyester constitutes between 4 and 50 wt % of the total solids content of the emulsion, and said resin constitutes between 96 and 50 wt % of the total solids content of the blend emulsion.

3. The emulsion as recited in claim 1, wherein said crosslinkable aqueous polyester constitutes between 8 and 30 wt % of the total solids content of the emulsion, and said resin constitutes between 92 and 70 wt % of the total solids content of the blend emulsion.

4. The emulsion as recited in claim 1, wherein said crosslinkable aqueous polyester has an intrinsic viscosity (IV) between 0.15 and 0.45 dl/g.

5. The emulsion as recited in claim 1, wherein said crosslinkable aqueous polyester has an acid number between 5 and 80 mg KOH/g.

6. The emulsion as recited in claim 5, wherein said crosslinkable aqueous polyester has an acid number between 15 and 60 mg KOH/g.

7. The emulsion as recited in claim 1, wherein said resin comprises a resin containing repeating units of an unsaturated monomer selected from the group consisting of acrylic acid, acrylate, acrylonitrile, and ethylene.

8. The emulsion as recited in claim 7, wherein said unsaturated monomer is selected from the group consisting of acrylic acid, acrylate, methacrylic acid, and methacrylate.

9. The emulsion as recited in claim 1, wherein said unsaturated monomer is selected from the group consisting of acrylic acid, methacrylic acid, butyl acrylate, methyl methacrylate, 2-ethylhexyl acrylate, 2-hydroxylpropyl methacrylate, 2-hydroxylpropyl acrylate, methyl acrylonitrile, ethylene acetate, styrene, and vinyl chloride.

* * * * *